April 28, 1953  P. F. A. VON WOLZOGEN KUHR  2,636,449
UNIVERSAL JOINT, ESPECIALLY FOR LOCOMOTIVES
DRIVEN BY ELECTROMOTORS
Filed Feb. 26, 1948

Inventor
Paul F.A. von Wolzogen Kuhr
By Robert E. Burns
Attorney

Patented Apr. 28, 1953

2,636,449

UNITED STATES PATENT OFFICE 2,636,449

UNIVERSAL JOINT, ESPECIALLY FOR LOCOMOTIVES DRIVEN BY ELECTROMOTORS

Paul F. A. von Wolzogen Kühr, Amsterdam, Netherlands, assignor to Werkspoor N. V., Amsterdam, Netherlands, a company of the Netherlands Application February 26, 1948, Serial No. 11,028
In the Netherlands December 15, 1947

5 Claims. (Cl. 105—131)

Designers of electric locomotives more and more lean to the idea to rigidly secure the electromotor to the frame. This entails the necessity to transmit the torque of the motor shaft to the driving wheel axle by means of a flexible member. The designers of a satisfactory construction therefor meet the difficulty that the space between the wheels of a locomotive is very restricted.

The invention, which provides a satisfactory solution of the problem, consists herein that the pinion, which meshes with the gear wheel on the driving wheel axle, is supported by bearings fitted in the casing enclosing said gear wheel and is coupled with the armature of the motor through a Cardan shaft, the trunnions or equivalent members of which are accommodated, respectively, within a central cavity of the pinion and within a hollow stub on the motorshaft.

Figure 1:
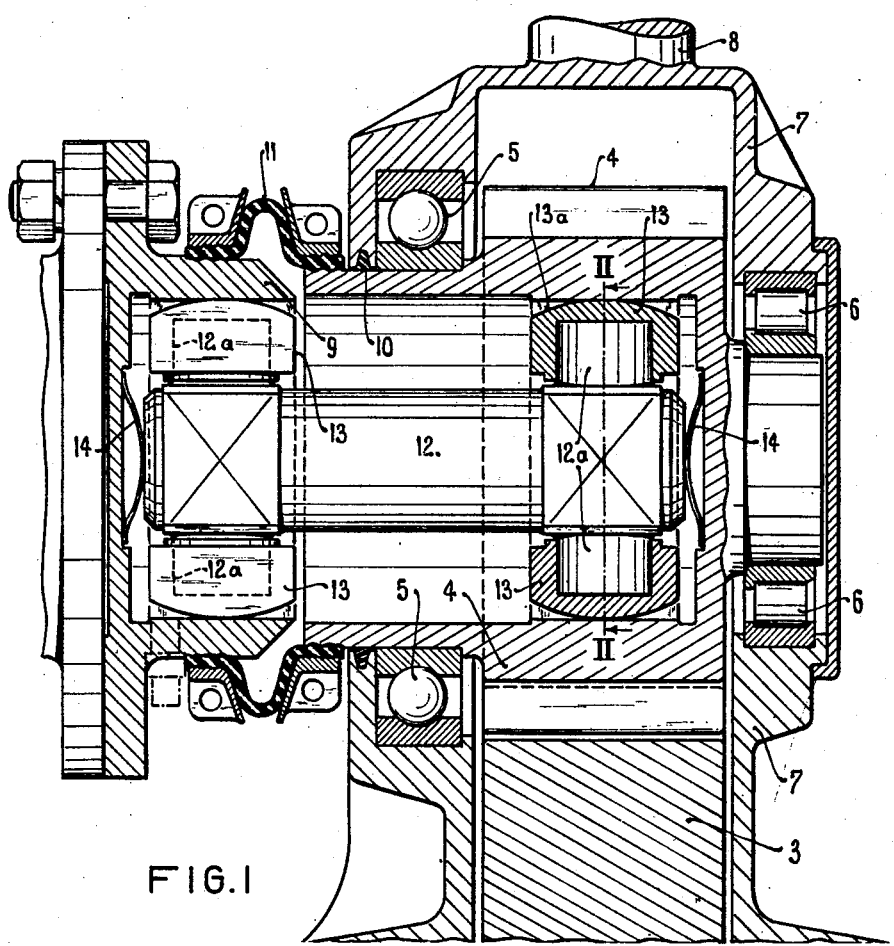
Figure 2:
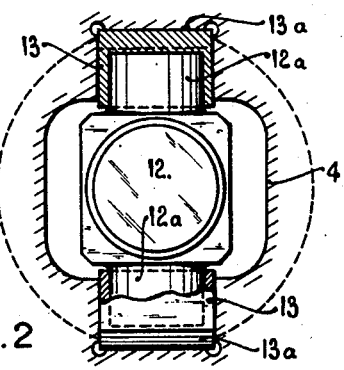

The drawing illustrates in Fig. 1 a sectional plan view of a universal joint in accordance with the invention, and Fig. 2 thereof is a section along the line II—II in Fig. 1.

3 is the gear wheel secured to the driving wheel axle (not shown) and 4 is the pinion meshing therewith. Said pinion is rotatably mounted in bearings 5, 6 fitted in a casing 7, which encloses the gear wheel 3, is loosely mounted on the driving wheel axle and is locked against rotation with said axle by means of a pin 8 flexibly associated with the frame (not shown).

9 is a stub on the shaft of the motor, which is to be rigidly secured to the frame of a locomotive or of a bogie thereof. The end face of said stub is situated opposite that of the pinion 4. The latter projects through a small distance from the gear wheel casing 7 and is sealed relative to the casing by means of a gasket 10. The gap between said opposite end faces is sealed by a flexible sleeve 11.

The pinion 4 is associated with the stub 9 through a Cardan shaft 12. The invention now resides in the special manner, in which the Cardan shaft is mounted, viz. in such a manner that the distance from the stub 9 to the pinion 4 can be reduced to a value just sufficient to enable said parts to perform the required movements relative to one another. To this end the Cardan trunnions or the equivalents thereof on both ends of the shaft 12 are accommodated within a cavity of the stub 9 and of the pinion 4, respectively. With a view thereto, either end of the shaft 12 is provided with two diametrically opposed trunnions 12a, each of which fits in a cylindrical bore of a block 13 disposed within a cavity of the stub 9 and of the pinion 4, respectively, so that it has only freedom of rocking movement in the drawing plane (i. e. the plane passing through the axes of the Cardan shaft and of the Cardan trunnions, respectively), abstracting from the fact that blocks 13, together with Cardan shaft 12, have a slight freedom of movement in the direction of the axis of said shaft, whose end faces bear against the bottoms of the said cavities through spring blades 14. With a view to this rocking movement, each block is bounded on the outer side by a cylindrical surface 13a, the axis of which intersects the drawing plane at right angles in the point of intersection of the axes of the Cardan trunnions and of the shaft 12, respectively. Thus, the pair of blocks 13 at each end of the Cardan shaft acts in the same manner as would a pair of Cardan trunnions provided on said shaft at right angles to the pair of trunnions 12a.

Obviously, the described universal joint could as well be used for other, similar purposes.

What I claim is:

1. A flexible coupling for connecting the driving motor of an electric locomotive with the driving wheel gear wheel of the locomotive to rotate the driving wheel which comprises, in combination, a pinion having an axial recess extending from one end of the pinion substantially throughout its length, bearing means adapted for rotatably supporting said pinion in fixed meshing relationship with said gear wheel, an axially recessed stub adapted to be connected to the shaft of said motor disposed in axial alignment with said pinion and in substantially abutting relationship thereto, the open ends of the recesses of said pinion and said stub being opposed and forming a substantially continuous closed recess, and a flexible driving connection unit between said stub and said pinion disposed substantially entirely within the recess in said pinion and the recess in said stub, said unit including a shaft axially disposed in said recesses, a pair of oppositely-disposed journal blocks at each end of said shaft, and a pivot block in each of said recesses having bores for accommodating said journal blocks, the outer surface of said pivot blocks being curved to permit a rocking motion thereof within said recesses, whereby positive power transmission between said motor and said pinion is effected while permitting limited relative displacement between said motor and said pinion.

2. A flexible coupling for connecting the driving motor of an electric locomotive with the driving wheel gear wheel of the locomotive to rotate the driving wheel which comprises, in combination, a pinion having an axial recess extending from one end of the pinion substantially throughout its length, bearing means adapted for rotatably supporting said pinion in fixed meshing relationship with said gear wheel, an axially recessed stub adapted to be connected to the shaft of said motor disposed in axial alignment with said pinion and in substantially abutting relationship thereto, a housing enclosing said pinion, said housing including bearing means rotatably supporting said pinion in fixed meshing relationship with said gear wheel, the open ends of the recesses of said pinion and said stub being opposed and forming a substantially continuous closed recess, and a flexible driving connection unit between said stub and said pinion disposed substantially entirely within the recess in said pinion and the recess in said stub, said unit including a shaft axially disposed in the said recesses, a pair of oppositely disposed journal blocks at each end of said shaft, and a pivot block in each of said recesses having bores for accommodating said journal blocks, the outer surface of said pivot blocks being curved to permit a rocking motion thereof within said recesses, whereby positive power transmission between said motor and said pinion is effected while permitting limited relative displacement between said motor and said pinion.

3. A flexible coupling for connecting the driving motor of an electric locomotive with the driving wheel gear wheel of the locomotive to rotate the driving wheel which comprises, in combination, a pinion having an axial recess extending from one end of the pinion substantially throughout its length, bearing means adapted for rotatably supporting said pinion in fixed meshing relationship with said gear wheel, an axially recessed stub adapted to be connected to the shaft of said motor disposed in axial alignment with said pinion and in substantially abutting relationship thereto, the open ends of the recesses of said pinion and said stub being opposed and forming a substantially continuous closed recess, a flexible sleeve bridging the gap between said extension and said stub whereby to enclose said recesses and permit retention of lubricant therein, and a flexible driving connection unit between said stub and said pinion disposed substantially entirely within the recess in said pinion and the recess in said stub, said unit including a shaft axially disposed in the said recesses, and a pair of oppositely disposed journal blocks at each end of said shaft, a pivot block in each of said recesses having bores for accommodating said journal blocks, the outer surface of said pivot blocks being curved to permit a rocking motion thereof within said recesses, whereby positive power transmission between said motor and said pinion is effected while permitting limited relative displacement between said motor and said pinion.

4. A flexible coupling for connecting the driving motor of an electric locomotive with the driving wheel gear wheel of the locomotive to rotate the driving wheel which comprises, in combination, a pinion having an axial recess extending from one end of the pinion substantially throughout its length, bearing means adapted for rotatably supporting said pinion in fixed meshing relationship with said gear wheel, said bearing means including a housing having sealing means for forming a fluid-tight enclosure around said pinion adapted to contain lubricant for lubricating the pinion, an axially recessed stub adapted to be connected to the shaft of said motor disposed in axial alignment with said pinion and in substantially abutting relationship thereto, the open ends of the recesses of said pinion and said stub being opposed and forming a substantially continuous closed recess, and a flexible driving connection unit between said stub and said pinion disposed substantially entirely within the recess in said pinion and the recess in said stub, said unit including a shaft axially disposed in the said recesses, a pair of oppositely disposed journal blocks at each end of said shaft, and a pivot block in each of said recesses having bores for accommodating said journal blocks, said pivot blocks having cylindrical surfaces curved to permit a rocking motion of said pivot blocks within said recesses in a plane through the axis of said shaft and said journal blocks, whereby positive power transmission between said motor and said pinion is effected while permitting limited relative displacement between said motor and said pinion.

5. A flexible coupling for connecting the driving motor of an electric locomotive with the driving wheel gear wheel of the locomotive to rotate the driving wheel which comprises, in combination, a pinion having an axial recess extending from one end of the pinion substantially throughout its length, bearing means adapted for rotatably supporting said pinion in fixed meshing relationship with said gear wheel, an axially recessed stub adapted to be connected to the shaft of said motor disposed in axial alignment with said pinion and in substantially abutting relationship thereto, a housing enclosing said pinion, said housing including bearing means rotatably supporting said pinion in fixed meshing relationship with said gear wheel and forming a fluid-tight enclosure around said pinion adapted to contain lubricant for lubricating said pinion, the open ends of the recesses of said pinion and said stub being opposed and forming a substantially continuous closed recess, a flexible sleeve bridging the gap between said extension and said stub whereby to enclose said recesses and permit retention of lubricant therein, and a flexible driving connection unit between said stub and said pinion disposed substantially entirely within the recess in said pinion and the recess in said stub, said unit including a shaft axially disposed in the said recesses, a pair of oppositely disposed journal blocks at each end of said shaft, and a pivot block in each of said recesses having bores for accommodating said journal blocks, said pivot blocks having cylindrical surfaces curved to permit a rocking motion of said pivot blocks within said recesses in a plane through the axis of said shaft and said journal blocks, whereby positive power transmission between said motor and said pinion is effected while permitting limited relative displacement between said motor and said pinion.

PAUL F. A. von WOLZOGEN KÜHR.

References Cited in the file of this patent

UNITED STATES PATENTS

| Number | Name | Date |
|---|---|---|
| 1,813,140 | Bethel | July 7, 1931 |
| 1,867,503 | Huber | July 12, 1932 |
| 2,024,688 | Gray | Dec. 17, 1935 |
| 2,360,786 | Miquelon | Oct. 17, 1944 |

FOREIGN PATENTS

| Number | Country | Date |
|---|---|---|
| 309,412 | Germany | Nov. 25, 1918 |
| 522,036 | Great Britain | of 1940 |